(12) United States Patent
Ito

(10) Patent No.: US 6,296,898 B1
(45) Date of Patent: Oct. 2, 2001

(54) METHOD AND SYSTEM FOR MANUFACTURING MAGNETIC RECORDING MEDIUM

(75) Inventor: Tetsuya Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/543,847

(22) Filed: Apr. 5, 2000

(30) Foreign Application Priority Data

Apr. 13, 1999 (JP) .................................................. 11-105533

(51) Int. Cl.$^7$ ........................................................ B05D 5/12
(52) U.S. Cl. ........................ 427/130; 118/203; 118/204; 118/244; 427/428
(58) Field of Search .................................. 427/128, 428, 427/130; 118/203, 204, 244

(56) References Cited

U.S. PATENT DOCUMENTS 4,548,840 * 10/1985 States et al. .

FOREIGN PATENT DOCUMENTS

9314292 * 1/1994 (DE) .
0603145 * 6/1994 (EP) .

* cited by examiner

Primary Examiner—Bernard Pianalto
(74) Attorney, Agent, or Firm—Sonnenschein, Nath & Rosenthal

(57) ABSTRACT

To prevent the quality of a magnetic recording medium from deteriorating due to a pressed mark caused by scattered paint tailings or residue of paint tailings when applying magnetic paint to a substrate in manufacturing a magnetic medium. In the step of applying magnetic paint onto a nonmagnetic support (5) in accordance with a gravure coating method, an organic solvent is supplied to the contact portion between a doctor blade (4) set to both ends of a gravure roller (7) and the gravure roller (7).

3 Claims, 3 Drawing Sheets

METHOD AND SYSTEM FOR MANUFACTURING MAGNETIC RECORDING MEDIUM

BACKGROUND OF THE INVENTION

1. Field of the Invention

The present invention relates to a method and a system for manufacturing a magnetic recording medium such as a magnetic tape.

2. Description of the Prior Art

A magnetic recording medium is generally manufactured in the form of a magnetic tape by applying magnetic paint containing a magnetic material onto a substrate serving as a long nonmagnetic support, applying a necessary treatment such as a magnetic-field orientation treatment to the substrate, drying the paint, and then smoothing the surface of the substrate.

The magnetic-paint applying method includes the gravure method, reverse method, and die method. In the case of the gravure coating method among the above methods, magnetic paint is applied to a gravure roller 7 to which a knurling treatment 8 (constant-directional longitudinal groove is formed) is applied as shown in FIG. 3.

The magnetic paint on the gravure roller 7 is transferred by setting a nonmagnetic support of a magnetic recording medium, that is, a base film (substrate) 5 between the gravure roller 7 and a back roller 9 and pressure-welding them.

Then, the surface of the substrate 5 to which the magnetic paint is applied is smoothed by a smoother 16, then made to pass through the cutting step, and a magnetic tape is obtained.

In this case, if the magnetic paint is applied up to ends of the substrate 5, various problems occur in that the magnetic paint attached to the gravure roller 7 is dried, removed, and scattered. Therefore, the magnetic paint is not applied to portions up to approx. 10 mm from ends.

Moreover, if the gravure roller 7 with the magnetic paint attached is rotated at a high speed, the thickness of the magnetic paint increases at only both ends of the gravure roller 7 due to knurling of the gravure roller 7 and the thickly attached paint is scattered due to rotation of the gravure roller 7.

Therefore, a resin plate referred to as a doctor blade 4 is provided for each end of the gravure roller 7 and pressed against the gravure roller 7 at a constant pressure to scrape off the magnetic paint.

An air tube 15 is set to a doctor blade 4 to take in scraped paint tailings by air and thereby prevent a recording or reproducing error from occurring due to attachment of paint tailings on a magnetic tape.

If the doctor blade 4 is used for a long time in the above manner, the air tube 15 is immediately clogged, paint tailings are not taken in, paint tailings scatter due to vibration of rotation, pressed marks of paint tailings are formed on a magnetic tape or paint tailings are attached to the tape. Therefore, it is necessary to replace the air tube 15 whenever the problem occurs.

SUMMARY OF THE INVENTION

The present invention is made to solve the above problems and its object is to provide a method and a system for manufacturing a magnetic recording medium capable of effectively removing paint tailings.

In a method according to the present invention for manufacturing a magnetic recording medium, an organic solvent is supplied to a contact portion between doctor blades set at both ends of a gravure roller and the gravure roller.

According to a method of the present invention for manufacturing a magnetic recording medium, it is possible to prevent paint tailings attached to both ends of a gravure roller from drying by supplying an organic solvent to a contact portion between a doctor blade and the gravure roller.

A system of the present invention for manufacturing a magnetic recording medium comprises a gravure coater for transferring magnetic paint by passing a nonmagnetic support between a gravure roller and a back roller, wherein solvent supply means is included which supplies an organic solvent to a contact portion between doctor blades set at both ends of the gravure roller and the gravure roller or vicinities of the contact portion.

A system of the present invention for manufacturing a magnetic recording medium makes it possible to prevent paint tailings attached to both ends of a gravure roller from drying by supplying an organic solvent to a contact portion between a doctor blade and the gravure roller.

DETAILED DESCRIPTION OF THE PREFERRED EMBODIMENT

An embodiment of the present invention is described below by referring to the accompanying drawings.

Figure 1:
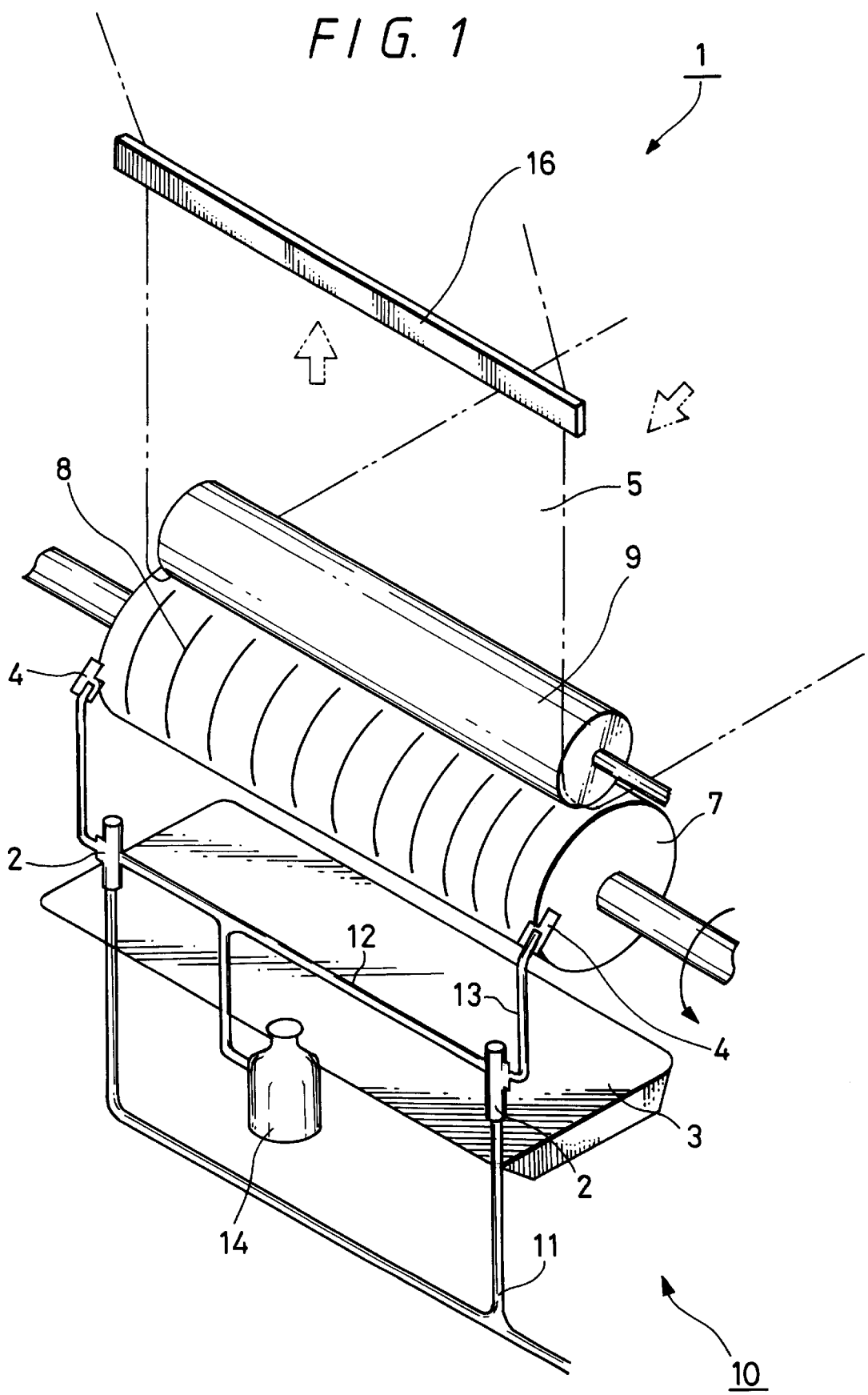
FIG. 1 is a schematic arrangement drawing of a magnetic-paint coater of the present invention.

FIG. 1 shows rough arrangement of a system of this embodiment for manufacturing a magnetic recording medium, that is, a gravure-coater serving as a magnetic-paint coater.

The gravure coater 1 of this embodiment is constituted of a gravure roller 7 with the surface coated with magnetic paint, a back roller 9 pressure-welded to the gravure roller 7 through a nonmagnetic support (substrate) 5, a smoother 16 for smoothing magnetic paint, a doctor blade 4 set to both ends of the gravure roller 7, solvent supply means 10 for supplying an organic solvent to the paint tailings attached to the both ends of the gravure roller 7, and a pan 3 set below the gravure roller 7.

A longitudinal groove referred to as knurling 8 is formed on the gravure roller 7 and rotated by holding magnetic paint supplied onto the gravure roller 7. The back roller 9 is set at the opposite side to press the substrate (nonmagnetic support for applying magnetic paint) against the gravure roller 7 and securely transfer magnetic paint while rotating together with the gravure roller 7 through the substrate.

Figure 2:
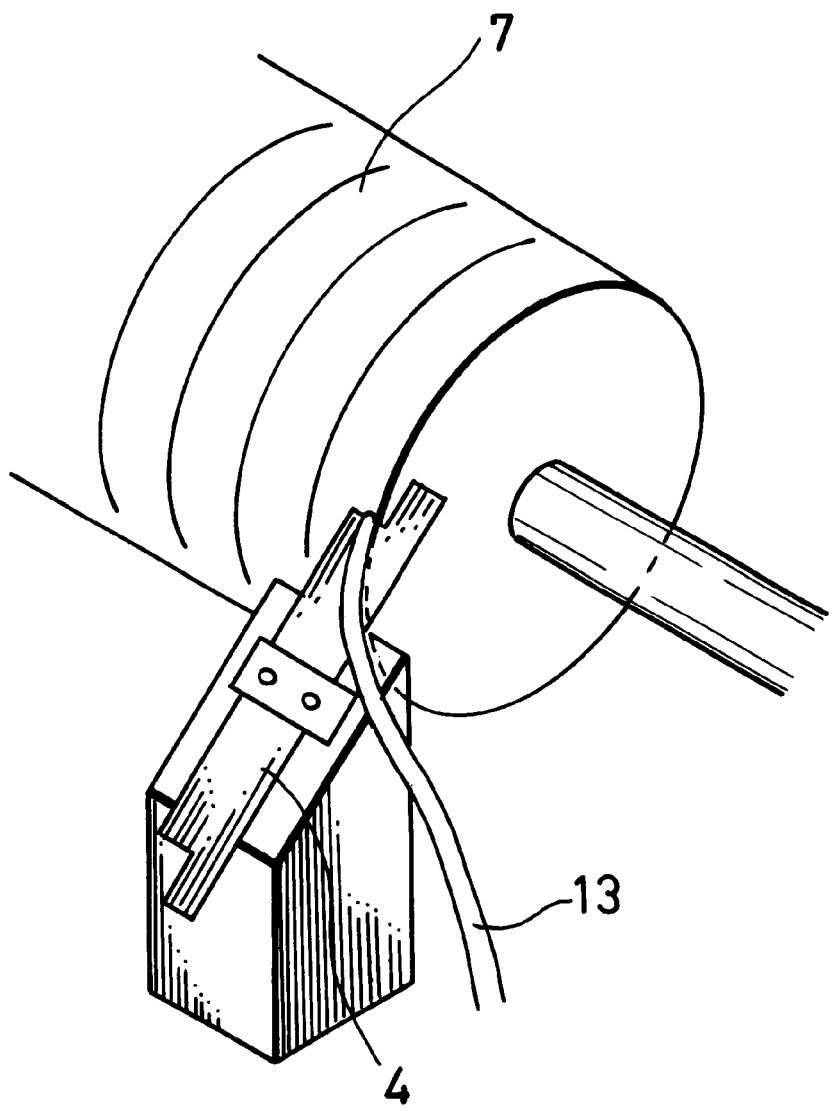
FIG. 2 is an enlarged view of a doctor blade and a solvent supply hose.
Figure 3:
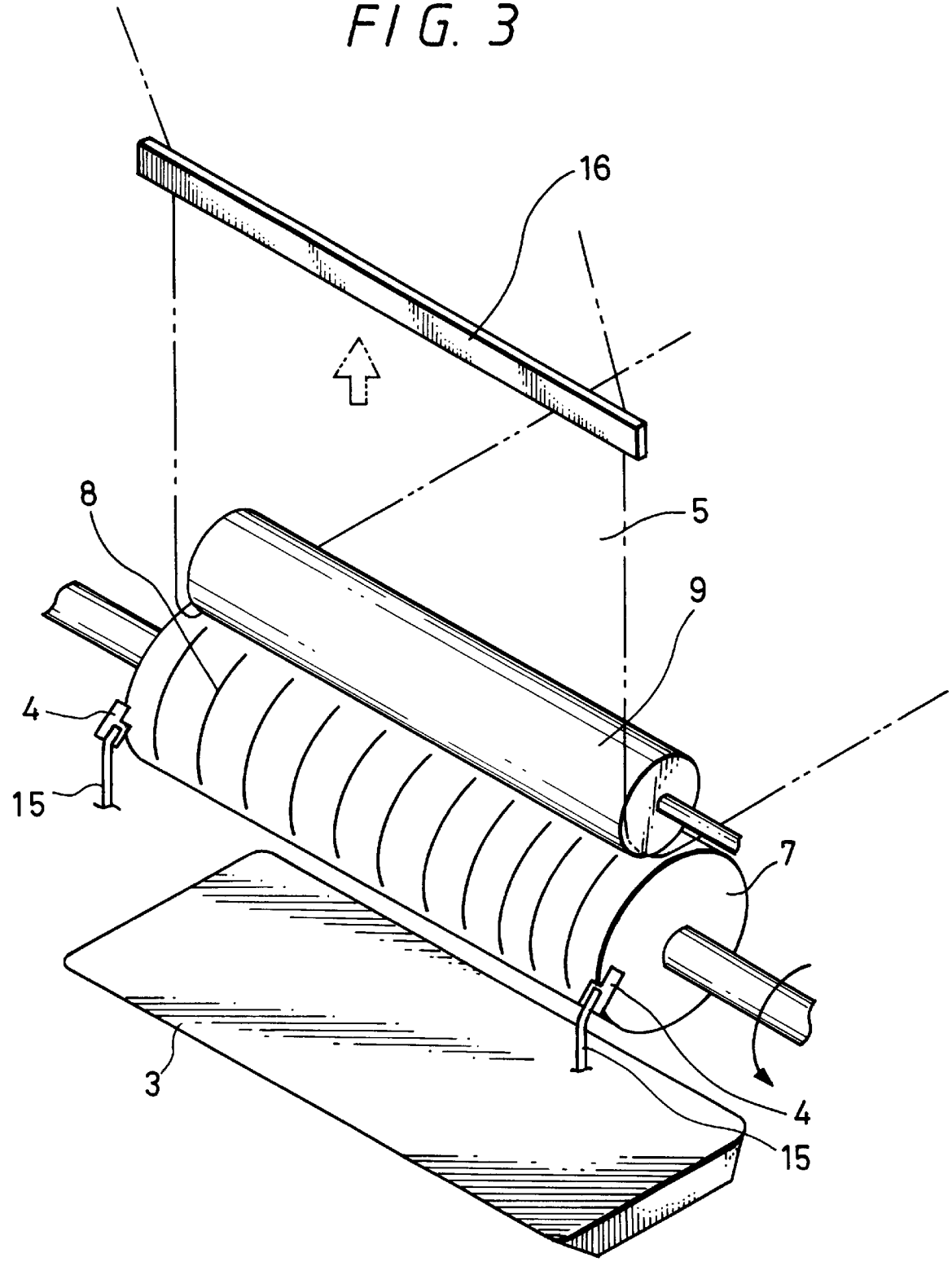
FIG. 3 is a schematic arrangement drawing of a conventional magnetic-paint coater.

As shown in FIG. 2, a resin plate is set to both ends of the gravure roller 7 as the doctor blade 4 and magnetic paint is scraped off from the surface of the gravure roller 7 by pressing the doctor blade 4 against the roller 7 at a constant pressure. This is because it is difficult to uniformly apply magnetic paint to both ends of the substrate 5, therefore non-coating area is formed at both ends of the substrate 5 by removing magnetic paint from ends of the gravure roller 7, and the magnetic paint is dried and removed by cutting the both ends of the substrate.

Moreover, because the thickness of magnetic paint at both ends increases when the gravure roller 7 rotates at a high speed, the doctor blade 4 is used to scrape off thickened magnetic paint so that the magnetic paint is not scattered and therefore, the blade 4 is set while it is tilted by a predetermined angle such as approx. 30° from the surface of the gravure roller 7.

The solvent supply means 10 is constituted of a solvent tank 14 storing a solvent, a solvent supply hose 13 set on the doctor blade 4 to supply a solvent to the contact portion with the doctor blade 4 at both ends of the gravure roller, and an air pump 2 for taking in the solvent from the solvent tank 14 through an air hose 11 connected to the solvent tank 14 and sending the solvent to the solvent supply hose 13.

According to the solvent supply means 10, the solvent in the solvent tank 14 is taken in by the air pump 2 through the air hose 11 and supplied to paint tailings on the gravure roller 7 at the contact portion between the gravure roller 7 and the doctor blade 4 through the solvent supply hose 13 set on the doctor blade 4. Thereby, paint tailings are prevented from drying and dissolved so as to drip to prevent the tailings from scattering.

The solvent supply hose 13 carries the solvent in the solvent storage tank 14 through the solvent hose 12 by the air pump 2. Therefore, it is preferable to use a solvent-resistant material having a diameter of 3 to 5 mm such as a polyethylene tube for the hose 13.

As the solvent used in this case, it is preferable to use an organic solvent having a comparatively low boiling point used as the solvent for the magnetic paint such as methyl ethyl ketone. The solvent is stored in the solvent storage tank 14 up to 10 to 12 lit to be used.

It is preferable to set the pressure of the air pump to 0.2 to 0.4 $kg/cm^2$.

Moreover, the pan 3 for receiving dripped and scraped paint tailings is set below the gravure roller 7.

The smoother 16 for smoothing the magnetic paint applied to the substrate 5 is used in the post-step of the back roller 9. The smoother 16 is made of a rectangular non-flexible material having a cross section of 3×10 cm such as metal or rigid plastic of approx. 130 cm covering the entire width of the substrate 5.

The substrate 5 of this embodiment uses any one of polyester such as polyethylene terephthalate, polyolefin such as polypropylene, cellulose derivative, and plastic such as polycarbonate, which is generally used for the nonmagnetic support of magnetic record medium. The width of the substrate 5 is set to approx. 1250 mm and the thickness of it is set to 3 to 100 $\mu$m.

Then, operations of the gravure coater 1 and the method of this embodiment for manufacturing a magnetic recording medium are described below. The gravure roller 7 rotates a substrate speed of approx. 350 m/min while magnetic paint is held on the entire surface of the roller 7 including the knurling 8.

The back roller 9 is pressed against the gravure roller 7 and rotates at the same speed as the roller 7, the substrate 5 is moved while being held between the back roller 9 and gravure roller 7, and the magnetic paint on the gravure roller 7 is transferred to the substrate 5.

Magnetic paint is made of magnetic powder, a binder, and an organic solvent. The magnetic powder uses ferromagnetic metal powder such as iron oxide and the binder uses one of a thermoplastic resin such as vinyl-chloride-based copolymer and a thermosetting resin such as polyurethane. The organic solvent for dissolving these binders uses one of methyl ethyl ketone (MEK) and methyl isobutyl ketone (MIBK). Magnetic paint is applied onto the substrate 5 at a thickness of 5 to 100 $\mu$m. A thickness of applied magnetic paint can be controlled by adjusting a pressure of the back roller 9.

The substrate 5 coated with the magnetic paint is sent upward in FIG. 1, smoothed by the smoother 16, guided to the subsequent drying step and calender step, and a magnetic recording medium is obtained.

As described above, paint tailings attached to both ends of the gravure roller 7 is scraped off by the doctor blade 4. In this case, a solvent is supplied onto the paint tailings on the gravure roller 7 at the contact portion between the doctor blade 4 and the gravure roller 7 and the vicinity of the contact portion from the solvent supply hose 13 and, for example, dripped.

It is preferable to set a dripping amount of solvent to 1.5 to 2.0 cc/min by one solvent supply hose 13 in the case of a substrate-5 applying speed of 500 m/min. It is preferable to set a dripping amount of solvent to 5 to 30 wt % for paint tailings and it is more preferable to set it to 7.5 to 10 wt %.

A solvent dripping amount of less than 5% is not preferable because a capacity for dissolving paint decreases or a solvent dripping amount of more than 30% is not preferable because solvent enters the mesh (knurling) of the gravure roller 7 to probably cause the magnetic paint at the margin of a magnetic tape or the like to change.

Thus, by dripping a proper amount of solvent to the contact point between the doctor blade 4 and the gravure roller 7 where paint tailings are collected, a viscosity of paint tailings is lowered, thereby paint tailings are easily dropped to the pan 3 provided below, and it is also possible to prevent paint tailings from drying.

Therefore, paint tailings do not scatter and it is possible to prevent a defective magnetic recording medium from being manufactured due to the fact that paint tailings are dropped onto magnetic paint to form a paint-tailings-pressed mark or residual paint tailings are produced.

According to a method of the present invention for manufacturing a magnetic recording medium, it is possible to lower a viscosity of paint tailings so that paint tailings are easily dropped to the pan by supplying a proper amount of solvent onto paint tailings on the contact portion between a doctor blades positioned at both ends of a gravure roller and the gravure roller and the vicinity of the contact portion where paint tailings are produced.

Therefore, because paint tailings can be prevented from drying, paint tailings do not scatter, it is possible to prevent a defective magnetic recording medium from being manufactured due to the fact that paint tailings are dropped onto magnetic paint to form a paint-tailings-pressed mark or residual paint tailings are produced.

Moreover, according to a system of the present invention for manufacturing a magnetic recording medium, it is possible to prevent paint tailings from drying and a defective magnetic tape from being manufactured due to the fact that a paint-tailings-pressed mark is formed on magnetic paint or residue of paint tailings is produced by scattered paint tailings because of using solvent supply means for supplying a proper amount of solvent onto paint tailings at the contact portion between a doctor blade and a gravure roller and the vicinity of the contact portion.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for manufacturing a magnetic recording medium comprising the steps of:

applying magnetic paint onto a nonmagnetic support in accordance with a gravure coating method;

scraping off magnetic paint from opposite ends of the gravure roller with doctor blades positioned at such ends, a contact portion between the gravure roller and each doctor blade existing for that purpose and lying within the ends of the gravure roller; and supplying an organic solvent to each contact portions.

2. The method for manufacturing a magnetic recording medium according to claim 1, wherein an amount of the organic solvent to the be supplied is set to 5 to 30 wt % of paint tailings.

3. A system for manufacturing a magnetic recording medium, comprising:

a gravure coater for transferring magnetic paint by passing a nonmagnetic support between gravure roller and a back roller, doctor blades appropriately positioned at ends of the gravure roller; and solvent supply means which supplies an organic solvent to a contact portion lying between the doctor blades and between the gravure roller.

* * * * *